(12) United States Patent
Myers et al.

(10) Patent No.: US 10,999,436 B1
(45) Date of Patent: May 4, 2021

(54) AGENT ACTION RANKING SYSTEM

(71) Applicant: Express Scripts Strategic Development, Inc., St. Louis, MO (US)

(72) Inventors: Christopher M. Myers, Dublin, OH (US); Danielle L. Smith, Cedar Park, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 141 days.

(21) Appl. No.: 16/444,535

(22) Filed: Jun. 18, 2019

(51) Int. Cl.

| | | |
|---|---|---|
| H04M 3/51 | (2006.01) | |
| G06N 3/08 | (2006.01) | |
| G10L 15/22 | (2006.01) | |
| G10L 25/90 | (2013.01) | |
| G10L 25/63 | (2013.01) | |
| G10L 15/16 | (2006.01) | |
| G06F 16/22 | (2019.01) | |

(52) U.S. Cl.
CPC ............ *H04M 3/5183* (2013.01); *G06N 3/08* (2013.01); *G10L 15/16* (2013.01); *G10L 15/22* (2013.01); *G10L 25/63* (2013.01); *G10L 25/90* (2013.01); *G06F 16/22* (2019.01); *G10L 2015/223* (2013.01)

(58) Field of Classification Search
CPC ............. H04M 3/5183; H04M 3/5233; H04M 3/5232; G06N 3/08
USPC .................................................... 379/265.09
See application file for complete search history.

(56) References Cited

U.S. PATENT DOCUMENTS

| | | | |
|---|---|---|---|
| 7,292,689 B2 | 11/2007 | Odinak et al. | |
| 7,386,850 B2 * | 6/2008 | Mullen | H04Q 3/64 379/265.01 |
| 8,116,445 B2 | 2/2012 | Odinak et al. | |
| 8,462,935 B2 | 6/2013 | Odinak et al. | |
| 8,666,032 B2 | 3/2014 | Odinak | |
| 8,990,084 B2 | 3/2015 | Gorin et al. | |
| 9,368,106 B2 | 6/2016 | Sidi et al. | |
| 9,818,401 B2 | 11/2017 | Printz | |
| 10,147,418 B2 | 12/2018 | Sidi et al. | |
| 10,152,972 B1 | 12/2018 | Thomas et al. | |

(Continued)

*Primary Examiner* — Ahmad F. Matar
*Assistant Examiner* — Jirapon Intavong
(74) *Attorney, Agent, or Firm* — Schwegman Lundberg & Woessner

(57) ABSTRACT

Method starts with processing, by processor, receiving audio signal of communication session between member-related client device and agent client device. Processor processes audio signal to generate caller utterances, each including audio caller utterance and transcribed caller utterance. Caller utterances includes first and second caller utterances. For each of the plurality of caller utterances, processor generates relationship data based on transcribed caller utterance, generates identified task based on transcribed caller utterance, and generates task completion probability result based on audio caller utterance, relationship data, and identified task, and stores the task completion probability result in a database. Processor computes agent action ranking score that is based on difference between task completion probability result of first caller utterance and task completion probability result of second caller utterance that precedes first caller utterance. Processor generates agent action result including the agent action ranking score. Other embodiments are disclosed herein.

21 Claims, 10 Drawing Sheets

(56) References Cited

U.S. PATENT DOCUMENTS

| | | |
|---|---|---|
| 10,354,642 B2 | 7/2019 | Gurunath Kulkarni et al. |
| 10,404,859 B1 | 9/2019 | Hernandez |
| 10,554,817 B1 * | 2/2020 | Sullivan .................. G06N 5/02 |
| 2005/0246177 A1 | 11/2005 | Long et al. |
| 2011/0228915 A1 * | 9/2011 | Chen .................. H04M 3/5166 |
| | | 379/88.04 |
| 2019/0014213 A1 | 1/2019 | Kumar et al. |

* cited by examiner

AGENT ACTION RANKING SYSTEM

CROSS-REFERENCE TO RELATED APPLICATIONS

This application is related to U.S. patent application Ser. No. 16/440,357, filed Jun. 13, 2019, and entitled "RELATIONSHIP DETERMINATION SYSTEM," U.S. patent application Ser. No. 16/442,753, filed Jun. 17, 2019, and entitled "TASK DETERMINATION BASED ON SPEECH ANALYSIS", which are incorporated by reference herein.

BACKGROUND

Since a user's perception of an organization can be greatly influenced by the customer service that is provided to the user, the organization has interest in ensuring that the user's experience with the customer service is impeccable. While, traditionally, customer service is a face-to-face interaction between the user and an agent that is employed by the organization, in order to increase the ability for the user to access to an agent of the organization, customer service is now accessible via many different means of communication. For example, a user may communicate with a human agent or an automated agent via an audio call (e.g., voice over IP (VoIP), telephone) or via an electronic messaging (e.g., online chat, text messaging).

Whether the user is interacting with a human agent or an automated agent, customer service aims to help the user complete his transaction in the most timely and efficient manner while ensuring that the user's experience with the customer service is enjoyable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
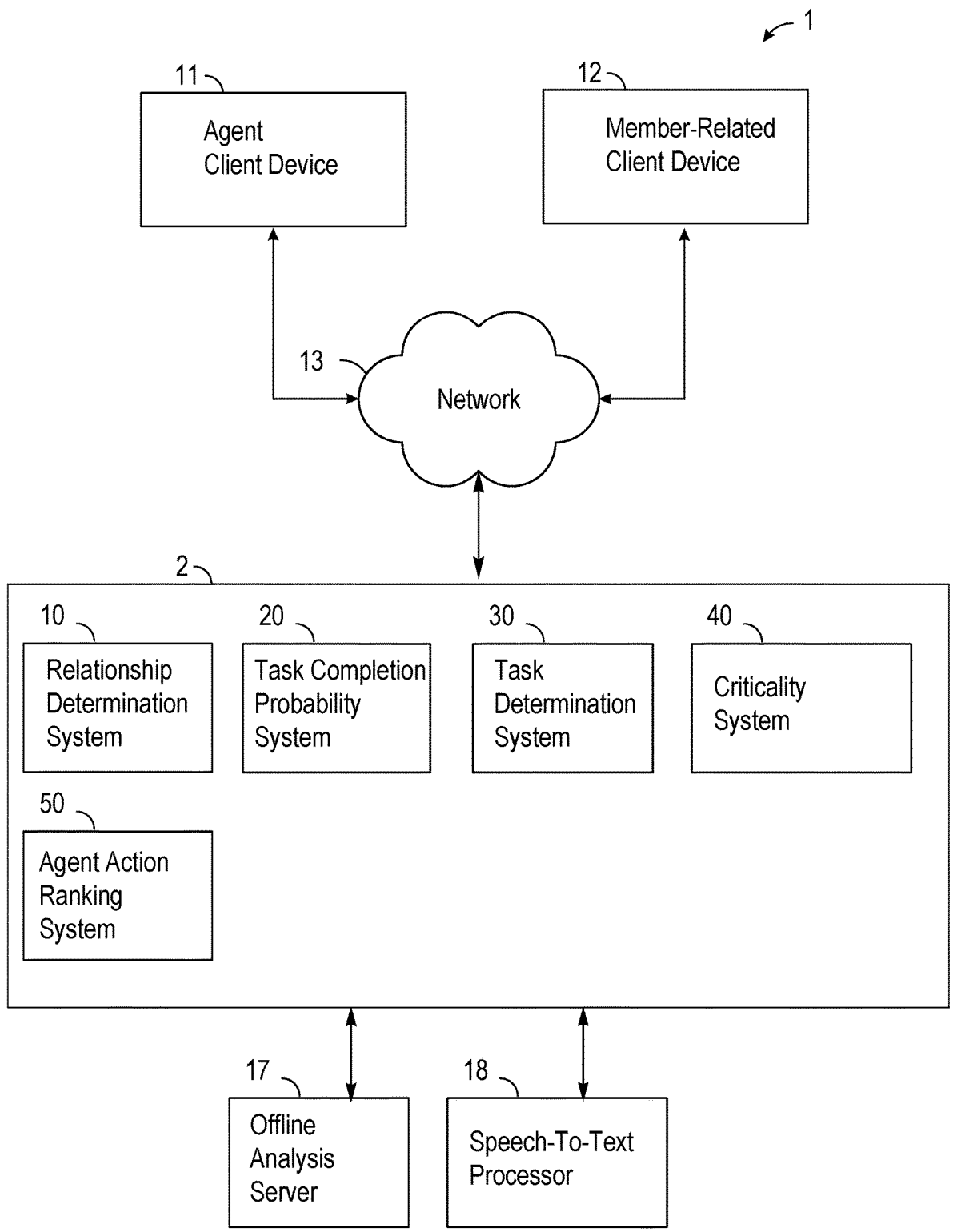
FIG. 1 is a block diagram showing an example system including a task determination system and an agent action ranking system according to various exemplary embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of customer service methods and systems. An organization can provide its members with access to customer service via different communication channels including audio calls (e.g., telephone call, VoIP, audio message, etc.) or via electronic messages (e.g., online chat, instant messaging, email, etc.). Optimally, the customer service experience via each of the communication channels should be equally timely, efficient and enjoyable for the member.

A user, e.g., a member or a representative of the member, may also access the customer service of the organization. The user may contact customer service to accomplish a variety of tasks that can greatly vary in complexity. For example, simple tasks include registering for a username and password on the organization's website, or resetting a password associated with the member's online account while more complex tasks include checking an order status, placing an order, requesting information regarding a prescription, or requesting an explanation of benefits associated with an account.

To add further complexity to the servicing the member, the member can also be contacting customer service on behalf of someone else. For example, when the service provided by the organization is medical in nature, customer service call centers can receive calls or electronic messages from a user (e.g., a device associated with the user) regarding prescriptions for another patient such as the user's child, spouse, parent, or charge. The user may be the member. The patient (e.g., the user's child, spouse, parent, or charge) may be the member. The user can also be a professional caregiver contacting the customer service on behalf of the patient, who is the member.

A medical group may use the customer service methods and systems as described herein. A medical group may include members, people who benefit from the medical group or are provided with medical treatment by the group. The medical group can be a medical insurer. The medical group can be a pharmacy benefit manager (PBM). The PBM may store data regarding member usage of prescription drugs and non-prescription medication or supplies. This data may be leveraged in order to provide a member the benefit and may be paid for by a client of the PBM. The clients of the PBM can include employers, group purchasing organizations, and governmental groups. In general, prescription drug and medicine data may be accessed from a PBM database. One or more operations may be performed on the prescription drug and medicine data to generate success data that quantifies the quality of the interaction between a member or a user contacting the medical group system and the agent of the medical group system, as described herein. The success data can quantify the ability of providing the right feedback, the perceived happiness of the caller with the interaction, whether the task the caller is contacting the system about completed in a timely manner, etc. The user contacting the medical group system can include a person related to the patient, a guardian of the patient, a caregiver of the patient, a medical care provider of the patient. In some cases, the user is also a member and is contacting the medical group on behalf of another member.

The tasks that the user wishes to complete are also associated with a different level of criticality that affects the interaction between the member and the agent. For example, a user (e.g., the member) may be contacting (e.g., calling) about his medication that he has not yet received or a user may be contacting (e.g., calling) on behalf of a member who has not yet received their prescription medication. The criticality of the call would depend on the type of medication he is waiting on. The type of medication he is waiting on would be stored in the database of the PBM.

When a user interacts with customer service via the different means of communication, it is optimal for the customer service provided via each of the different means to be equally effective. Otherwise, if a user easily completes a task by communication via an audio call with a human agent but struggles to complete the same task via an audio call with the automated agent, the organization is thus inadvertently training the user to preferably use one channel of communication (e.g., audio call with the human agent). This would be further detrimental to the organization if the user's preferred channel of communication is the least efficient channel to the organization.

Accordingly, to further improve the functionality of customer service software and systems, embodiment of the present disclosure generates an agent action result that includes an agent action score for a caller utterance. The agent action score of a caller utterance, for example, is based on the difference between the task completion probability result of the caller utterance and the task completion probability result of the preceding caller utterance. The task completion probability result is the probability that a task is completed and is based on an analysis of the communication between the user and the agent. The probability that the task is completed can be based on, for example, the task to be completed for the member, the criticality of the task, the relationship between the user and the person on behalf of which the user is contacting customer service, the tone of the user's speech, the pitch of user's speech, the loudness of the user's speech, etc.

FIG. 1 is a block diagram showing an example system 1 according to various exemplary embodiments. The system 1 can be a customer service system that includes a customer service server system 2, an agent client device 11, and a member-related client device 12 that are communicatively coupled over a network 13 (e.g., Internet, telephony network).

The agent client device 11 and the member-related client device 12 can be communicatively coupled via an audio call (e.g., VoIP, Public Switched Telephone Network, cellular communication network, etc.) or via electronic messages (e.g., online chat, instant messaging, text messaging, email, and the like). In another embodiment, the agent client device 11 and the member-related client device 12 are communicatively coupled via a telephone call using a telephony network 13. While FIG. 1 illustrates a single agent client device 11 and a single member-related client device 12, it is understood that a plurality of agent client devices 11 and a plurality of member-related client devices 12 can be included in the system 1 in other embodiments. As used herein, the term "client device" may refer to any machine that interfaces to a communications network (such as network 13) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The member-related client device 12 can include a microphone and speaker on a mobile electronic device, a telephone, or a self-service kiosk, e.g., at a pharmacy, a clinic, a doctor's office, a mobile relief center, and the like.

The network 13 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user using the member-related client device 12 can establish a communication session with an agent associated with the agent client device 11, e.g., through an electrical, optical or electromagnetic connection. The agent can be a human agent or an automated agent, e.g., on behalf of an organization. The automated agent can be associated with a medical group that includes the member. The automated agent can be an interactive voice response (IVR), a virtual online assistant, or a chatbot. The automated agent can be system that using instructions in hardware to receive input, e.g., utterances or digital data, from the user device and implement the instructions to formulate and output a reply from the agent client device. During a communication session between the user and the agent, the customer service server system 2 identifies the member using initial context data (e.g., the phone number the member is calling from, the website login information inputted, automatic number identification (ANI), etc.) and retrieves the data on the member (e.g., member account information, name, address, insurance information, information on spouse and dependents, etc.).

The customer service server system 2 in FIG. 1 includes a relationship determination system 10, a task completion probability system 20, a task determination system 30, a criticality system 40, and an agent action ranking system 50. The customer service server system 2 can further include elements described with respect to FIGS. 8 and 9, such as a processor and memory, having instructions stored thereon, that when executed by the processor, causes the processor to control the functions of the customer service server system 2. The processor is a dedicated machine when controlling functions of the customer service system 2.

As shown in FIG. 1, the system 1 can also include an offline analysis server 17 and a speech-to-text processor 18 that are communicatively coupled to each other and to the customer service server system 2. In one embodiment, the offline analysis server 17 and the speech-to-text processor 18 is included in the customer service server system 2 and communicatively coupled to the relationship determination system 10, the task completion probability system 20, the task determination system 30, the criticality system 40, and the agent action ranking system 50.

In the customer service server system 2 of FIG. 1, the relationship determination system 10 can analyze utterances or electronic messages from the communication session to build and transmit relationship data to the agent client device 11. The relationship data identifies the relationship between the user (who can be the member or the person on behalf of which the member is contacting customer service) and the member. The relationship determination system 10 can include an Application Program Interface (API) server, a relationship determination application server that can create events based on the relationship data generated, and a database that stores data processed by the relationship determination application server to build and transmit the relationship data. In one embodiment, the event includes the pertinent information about the type of relationship that is detected based on the relationship data. For example, the pertinent information can be "parent of member (identification number) 123 and member 123 is a minor". In one embodiment, a plurality of events can be generated because a user can be calling about several different members during a given call. A separate event can be generated as the context changes. For example, a user can be a user who is calling to fill a prescription for his wife and then his daughter. In this example, two separate events can be generated: a first event for husband and wife and a second event for father and daughter.

The relationship determination system 10 receives data (e.g., strings that are portions of the transcribed or digitized utterances or electronic messages) and transmits data (e.g., relationship data) to, for example, the agent client device 11 and the task completion probability system 20. Strings that are on the transcribed or digitized utterances or electronic messages can be an array data structure of words comprising phrases of input from a user. For example, a string can be an array of characters that contains the data from the automated transcription. The string can include one or more words that was provided by the user in response to a query. The string can also include a series of singularly spoken letters or number. For example, the user may be providing a member identification number or a prescription number. The string can also include a combination of words and singularly spoken letters or numbers. To generate the strings, the speech-to-text processor 18 can implement Fast Fourier Transforms (FFTs) or Neural Networks, such as Long-Short Term Memory Neural Networks (LSTM). The relationship determination system 10 can receive and transmit data in real-time. In one embodiment, the relationship determination system 10 receives data (e.g., strings that are on the transcribed/digitized utterances or electronic messages) from the task completion probability system 20 that is performing offline analysis of call recordings, audio strings, or chat transcripts between the member-related client device 12 and the agent client device 11. In one embodiment, the offline analysis server 17 is included in the customer service server system 2 and is performing the offline analysis. In another embodiment, the offline analysis server 17 is separate from customer service server system 2 and is performing the offline analysis. In one embodiment, the string that is an electronic message can be a portion of an online chat exchanged between the agent and the member that is received by the processor in real time. In this embodiment, the processor generates strings by processing online chat to parse and separate the different portions of the online chat.

Digitized utterances can be digitized audio files of user audio during the communication session. In this embodiment, the relationship determination system 10 can transmit data (e.g., relationship data) to the task completion probability system 20 offline. When the communication session between the agent client device 11 and the member-related client device 12 is an audio communication, the audio communication is processed in the customer service server system 2 (e.g., the speech-to-text processor 18) to convert each utterance from speech to text to generate a string that is received by the relationship determination system 10. In this embodiment, the audio communication is processed in the customer service server system 2 to generate each user utterance to a user audio string.

The database of the relationship determination system 10 can include membership data that includes general membership data related to the organization, rules implemented by the organization for membership, member authentication requirements, etc. The membership data can be for example data required for authentication, specific call routing requirements, information on member benefits, information on the member's plan, etc.

The database of the relationship determination system 10 can also include personal data related to all the members associated with the organization providing the customer service. The personal data can also be related to all other patients associated with the organization via the members. The database of the relationship determination system 10 can also include a personal graph or table that stores information regarding relationships and associations between members and other patients.

The database of the relationship determination system 10 can also store caregiver data including rules applied by the organization to authenticate caregivers, identification data for each of the caregivers in the system and the patients each caregiver is associated with, etc. Caregiver data can be, for example, types of permissible data used to authenticate a person as a caregiver such as pin numbers, member numbers, etc. Caregiver data can also set the types of data to be obtained from the user to validate the caregiver relationship.

The database of the relationship determination system 10 can store communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, transcribed text of full utterances provided by the user.

The database of the relationship determination system 10 can also store initial context data related to the member (e.g., user or patient) that has established a communication session with the agent client device 11. Initial context data can include, for example, website login information, automatic number identifier, telephone number. Initial context data can also include member account information such as name, address, employer, medication, insurance information, preferred pharmacy, and information on member's spouse or dependents.

In the customer service server system 2 of FIG. 1, the task determination system 30 processes information during the communication session between a user and an agent to generate an identified task. The identified task is the task that the user is wanting to complete during the communication session. The task can be related to the member that is the user, the user's spouse, child, charge, etc. Examples of tasks include, for example, checking on an order status, refilling a prescription, asking questions about a claim, paying a bill, etc. The task determination system 30 may include an API server, task determination application server that generates the identified task, and a database to store communication session information. The communication session information includes, for example, initial context information related to the member (e.g., a user or a patient) such as website login information, automatic number identifier, telephone number, as well as member account information such as name, address, employer, medication, insurance information, preferred pharmacy, and information on member's spouse or dependents.

The task determination system 30 receives data (e.g., strings included in the transcribed utterances, recorded utterances, or electronic messages) and transmits data (e.g., identified task) to, for example, the agent client device 11 and the task completion probability system 20. The task determination system 30 can receive and transmit data in real-time. In one embodiment, the task determination system 30 receives data (e.g., strings that are on the transcribed utterances or electronic messages) from the task completion probability system 20 that is performing offline analysis of call recordings or chat transcripts between the member-related client device 12 and the agent client device 11. In this embodiment, the task determination system 30 can transmit data (e.g., identified task, position in a logical flow associated with the identified task) to the task completion probability system 20 offline. In an example embodiment, offline can be when the user (e.g., using the member-related client device 12) is not engaged with the customer service server system 2. Offline can include a different communication path or session than the communication between the client devices 11, 12 or to the customer service system 2. When the communication session between the agent client device 11 and the member-related client device 12 is an audio communication, the audio communication is processed in the customer service server system 2 (e.g., speech-to-text processor 18) to convert each utterance from speech to text to generate a string that is received by the task determination system 30. Further details regarding the task determination system 30 is discussed in relation of FIG. 2.

In the customer service server system 2 of FIG. 1, the criticality system 40 processes information during the communication session between a user using a member-related client device 12 and an agent using agent client device 11 to generate a criticality value that indicates a level of criticality associated with the communication session. The criticality value may indicate a low or a high level of criticality. The criticality value can be a binary value (e.g., low or high) or can be a range of values. The criticality value can also be a value (e.g., from 0 to 1) that indicates the criticality of a condition that is the subject of the communication session. For example, the criticality value can indicate the level of illness of a patient. A patient undergoing chemotherapy or gene therapy may be associated with a criticality value approaching high (or approaching 1). A patient who is a transplant patient receiving maintenance medication may be associated with a criticality value of 0.5 (e.g., medium level of criticality) while a patient who is on statins which are drugs that lower cholesterol levels may be associated with a criticality value that is low (or approaching 0). The criticality system 40 can include an API server, criticality application server that generates the criticality value, and a database to store communication session information. The communication session information includes, for example, initial context information related to the member such as website login information, automatic number identifier, telephone number, as well as member account information such as name, address, employer, medication, insurance information, preferred pharmacy, and information on member's spouse or dependents. The criticality system 40 can generate a criticality value based on the communication session information.

The criticality system 40 receives data (e.g., strings included in the transcribed utterances, the audio utterances or the electronic messages) and transmits data (e.g., criticality value) to, for example, the agent client device 11 and the task completion probability system 20. The criticality system 40 can receive and transmit data in real-time. Real-time can be during a communication session between the client devices 11, 12. In one embodiment, the criticality system 40 receives data (e.g., strings included in the audio utterances, the transcribed utterances or the electronic messages) from the task completion probability system 20 that is performing offline analysis of call recordings or chat transcripts between the member-related client device 12 and the agent client device 11. In this embodiment, the criticality system 40 can transmit data (e.g., criticality value) to the task completion probability system 20 offline. When the communication session between the agent client device 11 and the member-related client device 12 is an audio communication, the audio communication is processed in the customer service server system 2 (e.g., speech-to-text processor 18) to convert each utterance from speech-to-text to generate a text string that is received by the criticality system 40 or to covert each utterance to an audio string that is received by the criticality system 40.

In the customer service server system 2 of FIG. 1, the task completion probability system 20 performs speech analysis to process the information during the communication session between a user and an agent and to generate a task completion probability. The task completion probability system 20 includes an API server that is coupled to and provides a programmatic interface to a task completion probability application server. For example, the task completion probability application server, using the API server, receive real-time access to the communication session between the user and the agent (e.g., between devices 11, 12). The communication session can include, for example, an interactive voice response (IVR) or a voice call with an agent that can be a human agent or an automated agent. The task completion probability application server may also use a batch interface to receive call recordings and analytics of the communication session from an external system for offline processing and training of the task completion probability application server.

The task completion probability application server can further include speech-to-text processor (not shown) that converts or transcribes an audio signal (e.g., the interactive voice response (IVR), the voice call, or the call recordings) into a transcribed audio signal, identifies separate parties in the audio signal and generates start and end times for each utterance included in the audio signal. The separate parties in the audio signal include for example the caller (e.g., a user and/or a member) and the agent. The task completion probability application server can remove agent utterances from the utterances included in the audio signal and separate the audio caller utterance from the audio signal using the start and end times for each of the utterances. The task completion probability application server can then select the transcribed caller utterance from the transcribed audio signal based on the audio caller utterance. The task completion probability application server can select the audio caller utterances from the audio signal.

The task completion probability application server can include a plurality of neural networks including pitch neural networks, loudness neural networks, tone neural networks, and task completion probability neural networks. In one embodiment, the task completion probability application server includes a plurality of neural networks per task. For example, the pitch neural networks can include one neural network per task, the loudness neural networks can include one neural network per task, the tone neural networks can include one neural network per task, and the task completion probability neural networks can include one neural network per task. The task completion probability application server is communicatively coupled to a database of the task completion probability system 20, in which is stored data processed by the task completion probability application server to build and transmit the task completion probability, as further described herein. In one embodiment, rather than including neural networks, the task completion probability application server includes a memory that stores instructions, when executed by a processor, causes processor to perform the operations of the pitch neural networks, loudness neural networks, tone neural networks, and task completion probability neural networks.

In the customer service server system 2 of FIG. 1, the agent action ranking system 50 generates an agent action ranking score that is based on the difference between the task completion probability result of a caller utterance and the task completion probability result of the preceding caller utterance. The agent action ranking system 50 also generates an agent action result including the agent action ranking score.

The agent action ranking system 50 receives data (e.g., strings included in the transcribed utterances, recorded utterances, or electronic messages) and transmits data (e.g., agent action result including the agent action ran king score) to, for example, the agent client device 11. The agent action ranking system 50 can receive and transmit data in real-time. In one embodiment, the agent action ranking system 50 receives data (e.g., strings that are computed the transcribed utterances or electronic messages) to perform real-time analysis of a communication session (e.g., audio call or electronic communication) between the member-related client device 12 and the agent client device 11. In another embodiment, the agent action ranking system 50 receives data (e.g., strings that are computed the transcribed utterances or electronic messages) to perform offline analysis of call recordings or chat transcripts between the member-related client device 12 and the agent client device 11. In this embodiment, the agent action ranking system 50 can transmit data (e.g., agent action result) to the agent client device 11 offline. In an example embodiment, offline can be when the user (e.g., using the member-related client device 12) is not engaged with the customer service server system 2. Offline can include a different communication path or session than the communication between the client devices 11, 12 or to the customer service system 2. When the communication session between the agent client device 11 and the member-related client device 12 is an audio communication, the audio communication is processed in the customer service server system 2 (e.g., speech-to-text processor 18) to convert each utterance from speech to text to generate a string (which is a machine readable part of the utterance or spoken phrases during the interaction) that is received by the agent action ranking system 50. Further details regarding the agent action ranking system 50 is discussed in relation of FIG. 3.

Figure 2:
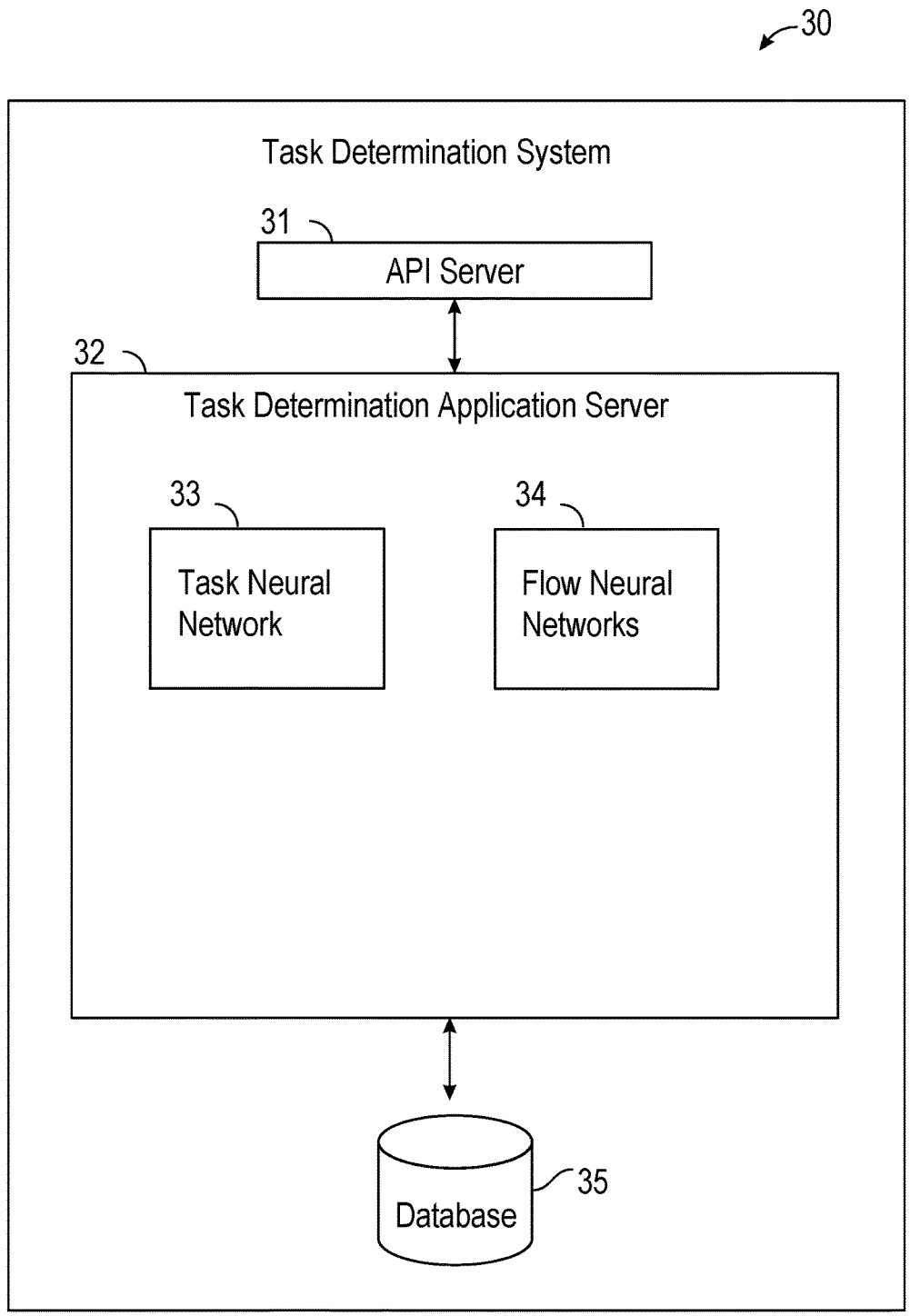
FIG. 2 is block diagram illustrating further details regarding the task determination system, according to exemplary embodiments.

FIG. 2 is block diagram illustrating further details regarding the task determination system 30, according to exemplary embodiments. The task determination system 30 includes an API server 31 that is coupled to and provides a programmatic interface to a task determination application server 32. For example, the task determination application server 32, using the API server 32, receive real-time access to the communication session between the user and the agent (e.g., between devices 11, 12). The communication session can include, for example, an interactive voice response (IVR), a voice call, or a chat (e.g., electronic communication) with an agent that can be a human agent or an automated agent. The task determination application server 32 may also use the API server 31 to receive call recordings, analytics of the call recordings, chat (e.g., electronic communication) and analytics of the chat, and predictive analysis from an external system for offline processing by the task determination application server 32.

The task determination application server 32 can further include speech-to-text processor (not shown) that converts or transcribes an audio signal (e.g., the interactive voice response (IVR), the voice call, or the call recordings) into caller utterances that include audio caller utterances and transcribed caller utterances. In one embodiment, the task determination application server 32 receives the caller utterances from the task completion probability system 20.

As shown in FIG. 2, task determination application server 32 includes a plurality of neural networks including a task neural network 33, and flow neural networks 34. In one embodiment, the task neural network 33 is a convolutional neural network (CNN). In one embodiment, the task completion probability application server 22 includes a plurality of flow neural networks 34. In this embodiment, each of the plurality of flow neural networks 34 are associated with a task. Each of the plurality of flow neural networks 34 can be a convolutional neural network (CNN). In one embodiment, the task completion probability application server 22 further includes a plurality of task state machines, each defining the logical flow of a different task.

The task determination application server 32 is communicatively coupled to the database 35, in which is stored data processed by task determination application server 32 to build and transmit the task result that includes the identified task and a position in the logical flow that associated with the identified task, as further described herein. In one embodiment, rather than including neural networks, the task determination application server 32 includes a memory that stores instructions, when executed by a processor, causes processor to perform the operations of the task neural network 33 and flow neural networks 34.

Figure 3:
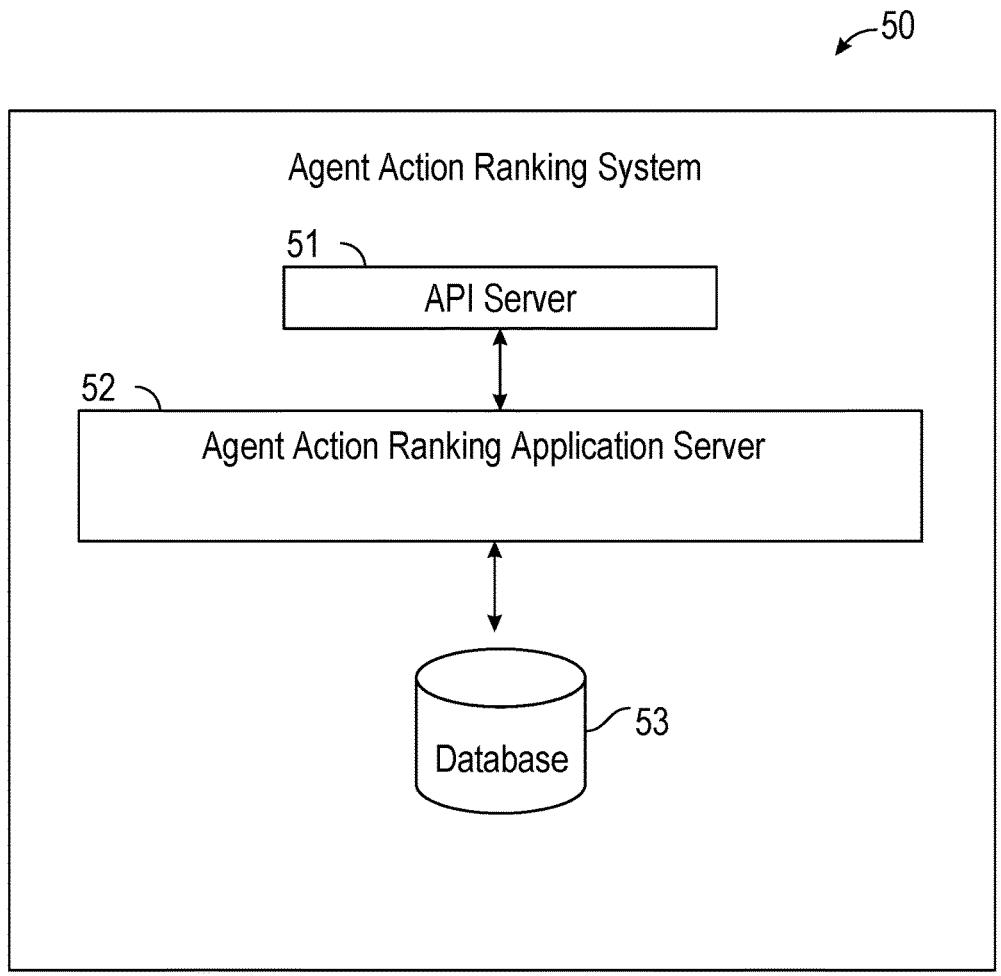
FIG. 3 is block diagram illustrating further details regarding the agent action ranking system, according to exemplary embodiments.

FIG. 3 is block diagram illustrating further details regarding the agent action ranking system 50, according to exemplary embodiments. The agent action ranking system 50 includes an API server 51 that is coupled to and provides a programmatic interface to an agent action ranking application server 52. For example, the agent action ranking application server 52, using the API server 51, receive real-time access to the communication session between the user and the agent (e.g., between devices 11, 12). The communication session can include, for example, an interactive voice response (IVR) or a voice call with an agent that can be a human agent or an automated agent. The agent action ranking application server 52 may also use a batch interface to receive call recordings and analytics of the communication session from an external system for offline processing by the task determination application server 32.

The agent action ranking application server 52 can further include speech-to-text processor (not shown) that converts or transcribes an audio signal (e.g., the interactive voice response (IVR), the voice call, or the call recordings) into caller utterances that include audio caller utterances and transcribed caller utterances. In one embodiment, the agent action ranking application server 52 receives the caller utterances from the task completion probability system 20.

The agent action ranking application server 52 is communicatively coupled to the database 53, in which is stored data processed by the agent action ranking application server 52 to build and transmit the agent action result that includes the agent action score, as further described herein.

Figure 4:
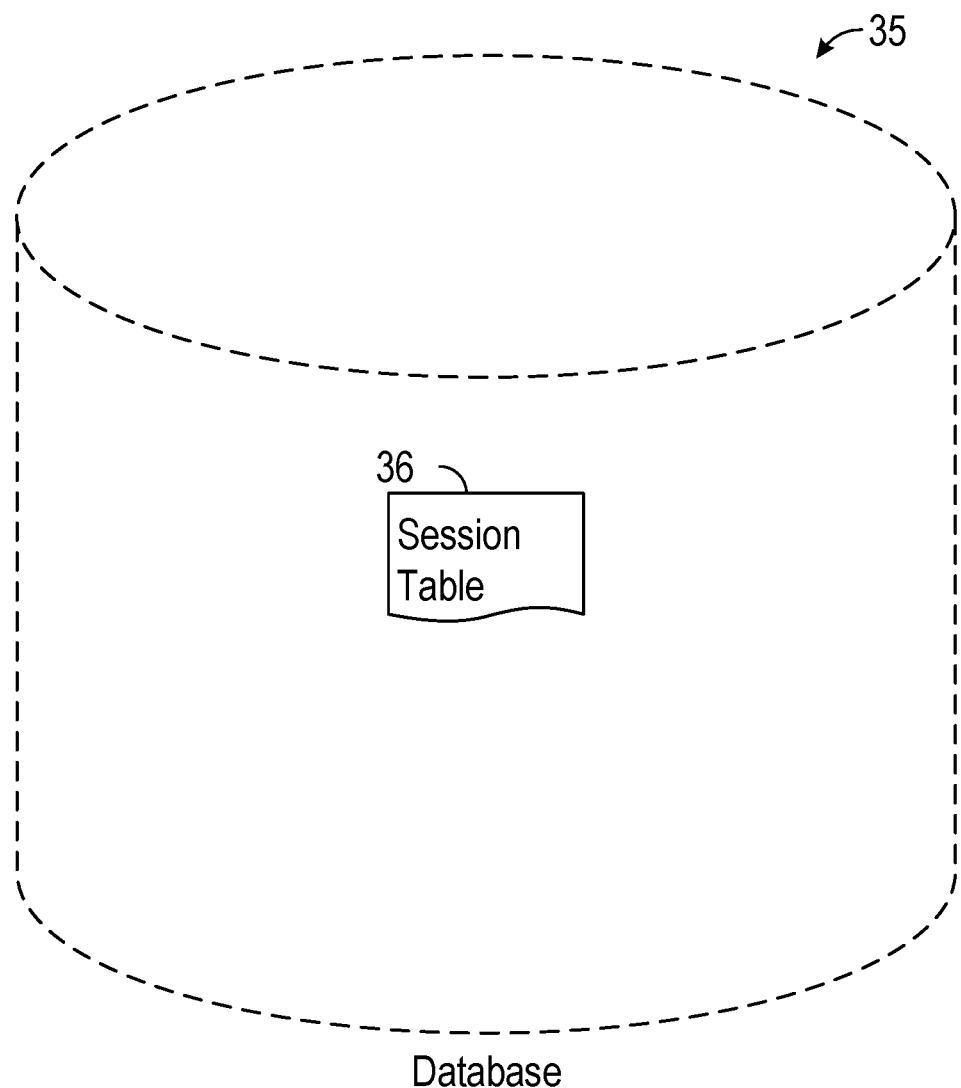
FIG. 4 is schematic diagram illustrating data which may be stored in the database of the task determination system, according to various exemplary embodiments.

FIG. 4 is a schematic diagram illustrating data that is stored in the database 35 of the task determination system 30, according to certain exemplary embodiments. While the content of the database 35 is shown to comprise a number of tables, the data could be stored in other types of data structures (e.g., as an object-oriented database). The database 35 includes a session table 36.

The session table 36 stores the communication session data that is data related to a communication session (e.g., a call, a chat, etc.) between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, audio caller utterances and transcribed text of full utterances provided by the user. The session table 36 can also include a plurality of tables that respectively store communication session data related to different callers (e.g., users or members).

The session table 36 can also store initial context data related to the member (e.g., user or patient) that has established a communication session with the agent client device 11. Initial context data can include, for example, website login information, automatic number identifier, telephone number. Initial context data can also include member account information such as name, address, employer, medication, insurance information, preferred pharmacy, and information on member's spouse or dependents.

The session table 36 can also store data generated by the task determination system 30. For example, the session table 36 can store identified tasks in association with caller utterances as well as positions in logical flows in association with caller utterances.

Figure 5:
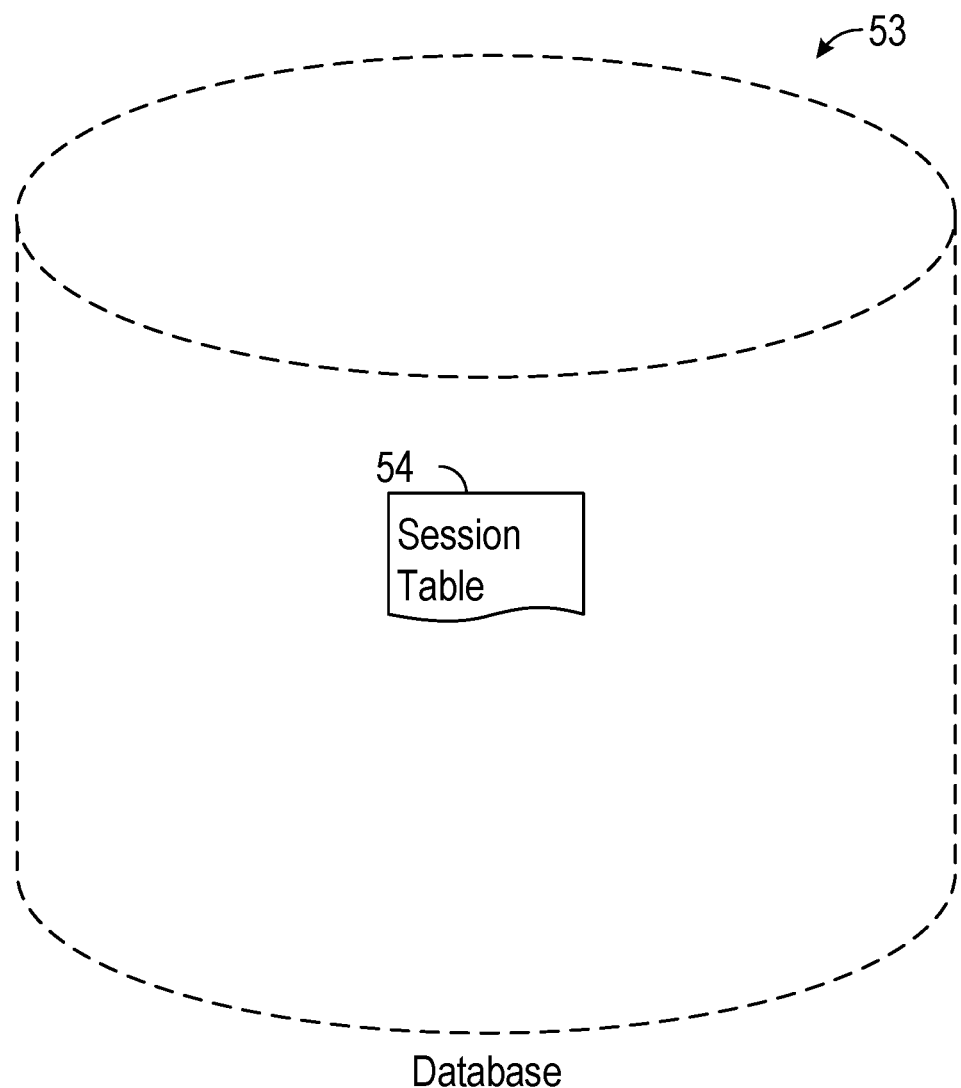
FIG. 5 is schematic diagram illustrating data which may be stored in the database of the agent action ranking system, according to various exemplary embodiments.

FIG. 5 is a schematic diagram illustrating data that is stored in the database 53 of the agent action ranking system 50, according to certain exemplary embodiments. While the content of the database 53 is shown to comprise a number of tables, the data could be stored in other types of data structures (e.g., as an object-oriented database). The database 53 includes a session table 54.

Similar to the session table 36, the session table 54 can store the communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, audio caller utterances and transcribed text of full utterances provided by the user.

The session table 54 can also store initial context data related to the member (e.g., user or patient) that has established a communication session with the agent client device 11. Initial context data can include, for example, website login information, automatic number identifier, telephone number. Initial context data can also include member account information such as name, address, employer, medication, insurance information, preferred pharmacy, and information on member's spouse or dependents.

The session table 54 can also store data received by the agent action ranking system 50 such as caller utterances in association with task completion probability values from the task completion probability system 20.

The session table 54 can also store data generated by the agent action ranking system 50. For example, the session table 54 can store the agent action score in association with the caller utterance, the normalized agent action score in association with the caller utterance, the agent action result, etc.

Although the following flow diagrams may describe the operations as a sequential process, many of the operations can be performed in parallel or concurrently. In addition, the order of the operations may be re-arranged. A process is terminated when its operations are completed. A process may correspond to a method, a procedure, a series of tasks, etc. The steps of methods may be performed in whole or in part, may be performed in conjunction with some or all of the steps in other methods, and may be performed by any number of different systems, such as the systems described in FIG. 1 and/or FIG. 10.

Figure 6:
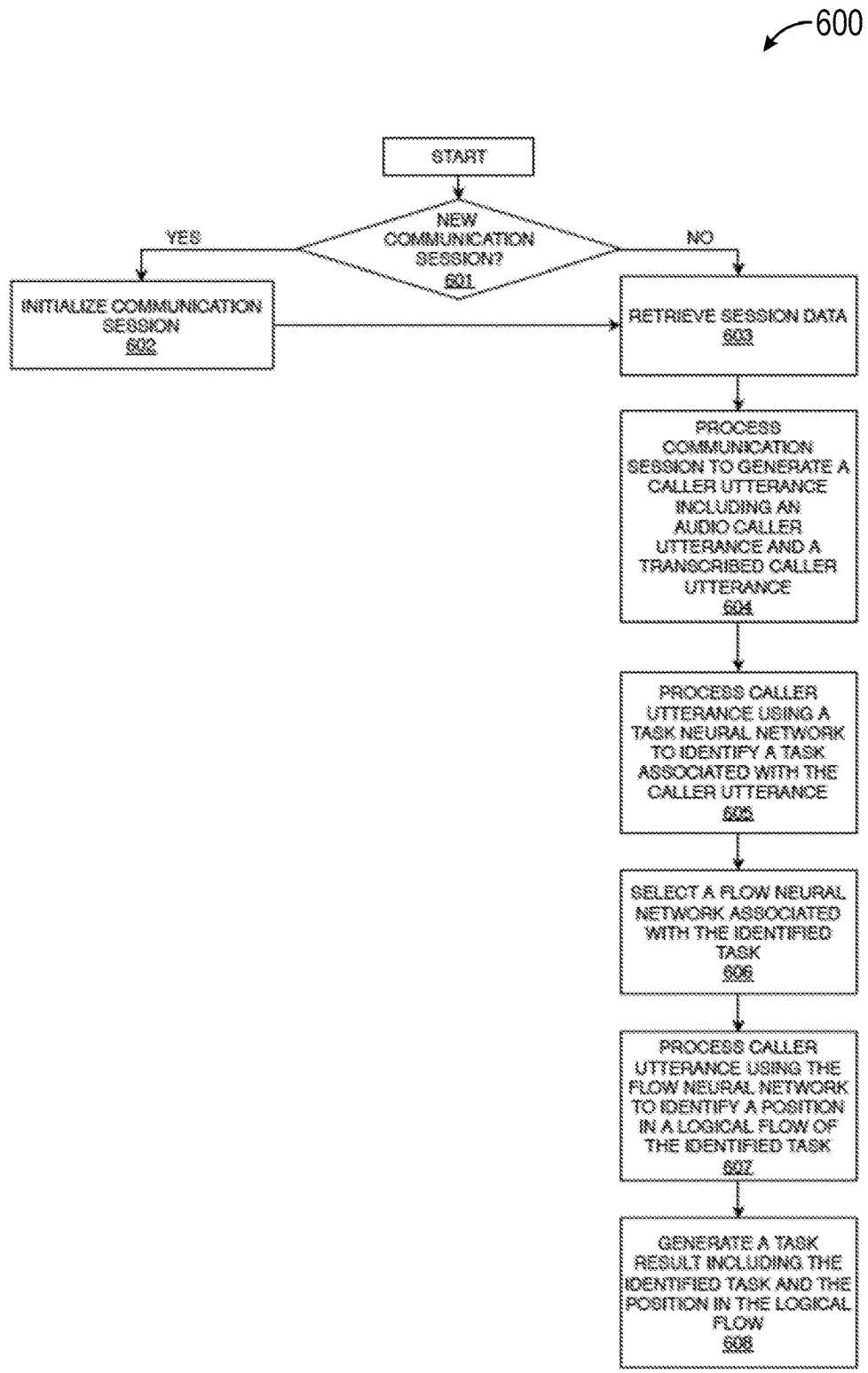
FIG. 6 is a flow diagram of an exemplary method of identifying a task associated with a caller utterance according to various aspects of the disclosure.

FIG. 6 is a flow diagram of an exemplary method 600 of identifying a task associated with a caller utterance according to various aspects of the disclosure. The method 600 can be performed by the customer service server system 2 in FIG. 1. In one embodiment, a processor included in the customer service server system 2 performs the method 600 or causes the customer service server system 2 to perform the method 600.

Method 600 starts, at operation 601, with a processor (or circuitry dedicated to performing instructed tasks) determining whether a new communication session is being established between the agent client device 11 and the member-related client device 12. The communication session can include, for example, an interactive voice response (IVR), a voice call, or an electronic message.

When the processor determines that a new communication session is being established at operation 601, the processor initializes the communication session between the agent client device 11 and the member-related client device 12 at operation 602. Initializing the communication session at operation 602 can include retrieving initial context data of the member and storing the initial context data of the member in the database. In one embodiment, the initial context data can include, for example, a website login information, an automatic number identifier (AIN), or telephone number. The initial context data can also include, for example, a member account information that includes name, address, employer, medication, insurance information, preferred pharmacy, or information on member's spouse or dependents.

When the processor determines that the communication session being established is not new (e.g., a continuation of a prior established communication session) at operation 601 or when the processor completes the initialization of the communication session at operation 602, the processor retrieves the session data that was previously stored in the database at operation 603.

At operation 604, the processor processes the communication session to generate a caller utterance that includes an audio caller utterance and a transcribed caller utterance. In one embodiment, the processor receives an audio signal of the communication session and processes the audio signal to generate the audio caller utterance and the transcribed caller utterance. The processor can determine the differences in frequency components in the speech of each participant on the call to separate the caller utterances from the agent utterances. In one embodiment, the processor causes the task completion probability system 20 to process the audio signal to generate the audio caller utterance and the transcribed caller utterance.

At operation 605, the processor processes the caller utterance using a task neural network to identify a task associated with the caller utterance (e.g., identified task). The identified task is the task that the caller is wanting to complete during this portion of the communication session (e.g., the caller utterance). The task neural network can generate the identified task based on the transcribed caller utterance. In some embodiments, the identified tasks are generated for a plurality of transcribed caller utterances. The task neural network can compare string for an utterance to known strings that are linked to specific tasks or the closest match from the known tasks.

In one embodiment, the processor can cause the task determination system 30 to perform the operation 605 to generate the identified task. The task neural network can be a Convolutional Neural Network (CNN) that is trained offline to identify the task that is the subject of the caller utterance among a plurality of tasks. In one embodiment, the task neural network processes the transcribed caller utterance at an input layer, an embed layer, one or more hidden layers and a Sigmoid layer. The input layer receives the transcribed caller utterance and separate the transcribed caller utterance into separate words. Each word in the transcribed caller utterance is passed to the embed layer for processing. For example, the embed layer receives and translates each word into numerical values. The one or more hidden layers further process the values received from the embed layer and generate values that are provided to the Sigmoid layer. The Sigmoid layer is the final layer that processes and outputs a value. The task neural network can output a value that is within a range (e.g., 0 to 1). For example, a value being closer to 1 indicates a task is most likely to be the identified task that is the subject of the caller utterance while a value being closer to 0 indicates that the task is not likely to be the identified task. Using the task neural network output values, the task determination system 30 can determine the identified task. In one embodiment, the processor stores the identified task in association with the caller utterance in the database (e.g., database 35).

At operation 606, the processor selects a flow neural network associated with the identified task. Each of the tasks that the user wishes to complete are associated with a logical flow. The logical flow is a path taken by the user to successfully complete his task. For some tasks, the logical flow is a sequential or linear transaction. These tasks include, for example, obtaining an order refill, inquiring about an order status, authentication of the user, etc. Other tasks are associated with logical flows that are very complex. For example, the logical flow that for a user that wishes to obtain an explanation of his benefits is very complex given that different aspects of the benefits may be questioned in any order. Accordingly, each task is associated with a different flow neural network.

At operation 607, the processor processes the caller utterance using the flow neural network associated with the identified task to identify a position in the logical flow of the identified task associated with the caller utterance. The flow neural network can generate the position in the logical flow based on the transcribed caller utterance.

In one embodiment, the processor can cause the task determination system 30 to perform the operation 607. The flow neural networks can be a Convolutional Neural Network (CNN) that are trained offline to determine the position in the logical flow of the identified task associated with the caller utterance. In one embodiment, the flow neural network processes the transcribed caller utterance at an input layer, an embed layer, one or more hidden layers and a Sigmoid layer. The input layer receives the transcribed caller utterance and separate the transcribed caller utterance into separate words. Each word in the transcribed caller utterance is passed to the embed layer for processing. For example, the embed layer receives and translates each word into numerical values. The one or more hidden layers further process the values received from the embed layer and generate values that are provided to the Sigmoid layer. The Sigmoid layer is the final layer that processes and outputs a value. The flow neural network can output a value that is within a range (e.g., 0 to 1). For example, a value being closer to 1 indicates the position in the logical flow is most likely to be the position where the caller is in the logical flow based on the caller utterance while a value being closer to 0 indicates that the position is not likely to be the position where the caller is in the logical flow based on the caller utterance. Using the flow neural network output values, the task determination system 30 can determine the position in the logical flow of the identified task associated with the caller utterance. In one embodiment, the processor stores the position in the logical flow in association with the caller utterance in the database (e.g., database 35).

At operation 608, the processor generates a task result that includes the identified task and the position in the logical flow. In one embodiment, the task result is transmitted to the agent client device 11.

Figure 7:
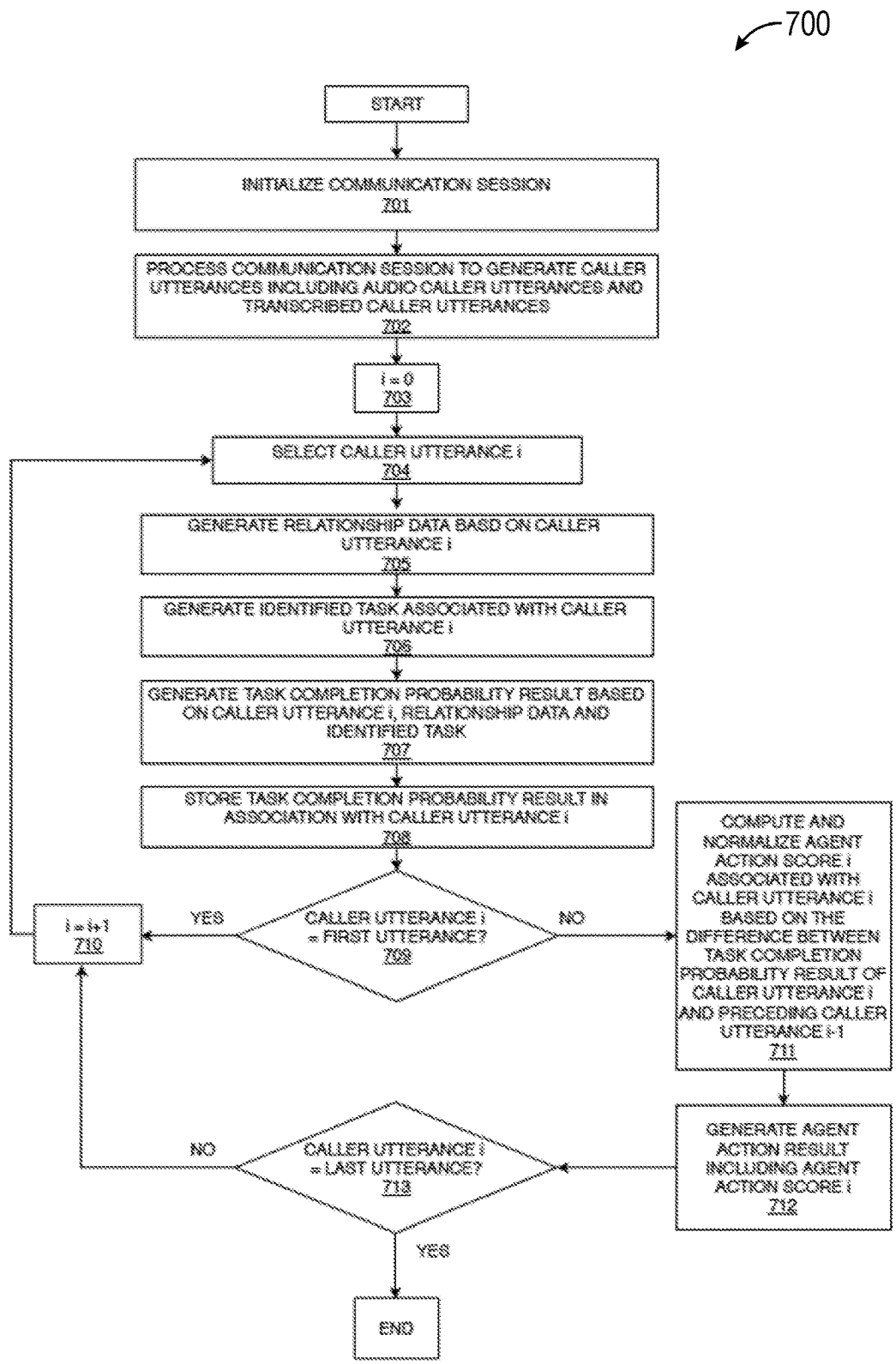
FIG. 7 is a flow diagram of an exemplary method of generating agent action result according to various aspects of the disclosure.

FIG. 7 is a flow diagram of an exemplary method of generating agent action result according to various aspects of the disclosure. The method 700 can be performed by the customer service server system 2 in FIG. 1. In one embodiment, a processor included in the customer service server system 2 performs the method 700 or causes the customer service server system 2 to perform the method 700.

Method 700 starts, at operation 701, with a processor (or circuitry dedicated to performing instructed tasks) initializing the communication session between the agent client device 11 and the member-related client device 12. The communication session can include, for example, an interactive voice response (IVR), a voice call, or an electronic message.

Initializing the communication session at operation 701 can include retrieving a session identification number and member context. Initializing the communication session at operation 701 can further include retrieving initial context data of the member and storing the initial context data of the member in the database. In one embodiment, the initial context data can include, for example, a website login information, an automatic number identifier (AIN), or telephone number. The initial context data can also include, for example, a member account information that includes name, address, employer, medication, insurance information, preferred pharmacy, or information on member's spouse or dependents.

At operation 702, the processor processes the communication session to generate a caller utterance that includes an audio caller utterance and a transcribed caller utterance. In one embodiment, the processor receives an audio signal of the communication session and processes the audio signal to generate the audio caller utterance and the transcribed caller utterance. In one embodiment, the processor causes the task completion probability system 20 to process the audio signal to generate the audio caller utterance and the transcribed caller utterance.

In order to process each of the caller utterances, at operation 703, the processor sets an index i to 0 and at operation 704, the processor selects the caller utterance i.

At operation 705, the processor generates a relationship data associated with the caller utterance i. The processor can cause the relationship determination system 10 in FIG. 1 to compute the relationship data based on the transcribed caller utterance. The relationship data includes at least one potential relationship between the caller and a patient that is the subject of the transcribed caller utterance. When the caller is communicating with the agent on behalf of himself, the processor can generate the relationship data that includes "self." When the caller is communicating with the agent on behalf of another person (e.g., a patient), the relationship data indicates the relationship between the caller and the patient in order further facilitate in assisting the member. For example, the relationship types include a parent-child relationship in which the caller is a parent and the patient is the caller's child (either the parent or the child can be the member); child-parent relationship in which the caller is a caretaker child and the patient is the caller's parent and member; spousal relationship in which the caller and the patient are spouses; and professional caregiver relationship in which the caller is a professional caregiver for the patient (member). In an example embodiment, the caller is a medical professional calling on behalf of the patient, who is the member.

At operation 706, the processor generates an identified task associated with the caller utterance i. The processor can cause the task determination system 30 in FIG. 1 to generate the identified task. In one embodiment, the processor causes the task determination system 30 is caused to process the transcribed caller utterance using the task neural network generate the identified task. In one embodiment, the processor further causes the task determination system 30 to select a flow neural network from the plurality of flow neural networks that is associated with the identified task, and to process the transcribed caller utterance using the selected flow neural network generate a position in a logical flow associated with the identified task. In one embodiment, the processor further causes the task determination system 30 to generate a task result that includes the identified task and the position in the logical flow associated with the identified task.

At operation 707, the processor generates a task completion probability result based on the caller utterance i, the relationship data, and the identified task. The processor can cause the task completion probability system 20 in FIG. 1 to generate the task completion probability result. The task completion probability system 20 can generate the task completion probability result by sampling the audio caller utterance to generate a plurality of samples of the audio caller utterance. The task completion probability system 20 then generates a loudness result based on loudness values of the plurality of samples using a loudness neural network associated with the identified task, generates a pitch result based on pitch values of the plurality of samples using a pitch neural network associated with the identified task, generates a tone result for a plurality of words in the transcribed caller utterance using a tone neural network associated with the identified task, and generates the task completion probability result using a task completion probability neural network associated with the identified task. The task completion probability system 20 then generates the task completion probability result based on the loudness result, the pitch result, the tone result, or any combination thereof. The task completion probability result indicates the likelihood of the identified task being successfully completed based on the speech analysis.

The selected task completion probability neural network can be a convolutional neural network (CNN). The task completion probability result that is generated using a selected task completion probability CNN can be a value within a range (e.g., 0 to 1). In one example, a task completion probability result of 0 indicates a lower likelihood of the successful completion of the identified task and the task completion probability result of 1 indicates a higher likelihood of a successful completion of the identified task.

At operation 708, the processor stores the task completion probability in association with the caller utterance i in a database (e.g., database 53).

At operation 709, the processor determines whether the caller utterance i is the first caller utterance in the communication session (e.g., no preceding caller utterances). If the caller utterance i is the first caller utterance, at operation 710, the processor increases the value of i by 1 and sets the index i to i+1 (e.g., i=i+1) and the method 700 proceeds to operation 704.

If the processor determines, at operation 709, that the caller utterance i is not the first caller utterance in the communication session, at operation 711, the processor computes and normalizes an agent action score i associated with the caller utterance i. The agent action score i is based on the difference between the task completion probability of caller utterance i and the preceding caller utterance i−1. Based on the difference between the task completion probability of caller utterance i and the preceding caller utterance i−1, the agent action ranking score indicates a level of beneficial change or a level of negative change.

In one embodiment, to compute the agent action score i, the processor computes the difference (e.g., $\Delta_{Slope}$) between the task completion probability of caller utterance i (e.g., $P_{current}$) and the task completion probability of preceding caller utterance i−1 (e.g., $P_{Prior}$).

$$\Delta_{Slope} = P_{Current} - P_{Prior}$$

The processor can further compute the weight to attribute to the difference (e.g., $W_{Slope}$). For example, the weight of the difference (e.g., $W_{Slope}$) can be computed using the hyperbolic tangent function of the absolute value of the difference (e.g., $\Delta_{Slope}$).

$$W_{Slope} = \tanh(\text{abs}(\Delta_{Slope}))$$

The processor can compute the weight to attribute to the probability (e.g., $W_{Probability}$) by subtracting the weight of the difference (e.g., $W_{Slope}$) from 1.

$$W_{Probability} = 1 - W_{Slope}$$

Using the computed values for difference (e.g., $\Delta_{Slope}$), weight of the difference (e.g., $W_{Slope}$), and the weight of the probability (e.g., $W_{Probability}$), and the task completion probability of caller utterance i (e.g., $P_{current}$), the processor can compute the agent action score i. For example, the agent action score i can be computed using the following equation:

$$\text{Agent Action Score } i = (W_{Slope} * \Delta_{slope}) + (W_{Probability} * P_{Current})$$

In one embodiment, the processor normalizes the agent action score i between a low and a high value (e.g., 0 and 1). In this embodiment, large beneficial changes are associated with normalized agent action scores that are near the high value (e.g., 1). It is understood that small changes as the probability nears the high value (e.g., 1) are also associated with normalized agent action scores that are near the high value (e.g., 1). Similarly, large negative changes are associated with normalized agent action scores that are near the low value (e.g., 0). It is understood that small changes as the probability nears the low value (e.g., 0) are also associated with normalized agent action scores that are near the low value (e.g., 0).

At operation 712, the processor generates an agent action result including the agent action score i. In some embodiments, the processor causes the agent action result to be transmitted to the agent client device 11.

At operation 713, the processor determines whether caller utterance i is the last utterance in the communication session. If the caller utterance i is not the last caller utterance, at operation 710, the processor increases the value of i by 1 and sets the index i to i+1 (e.g., i=+1) and the method 700 proceeds to operation 704. If the caller utterance i is the last caller utterance, the processor ends the method 700.

Figure 8:
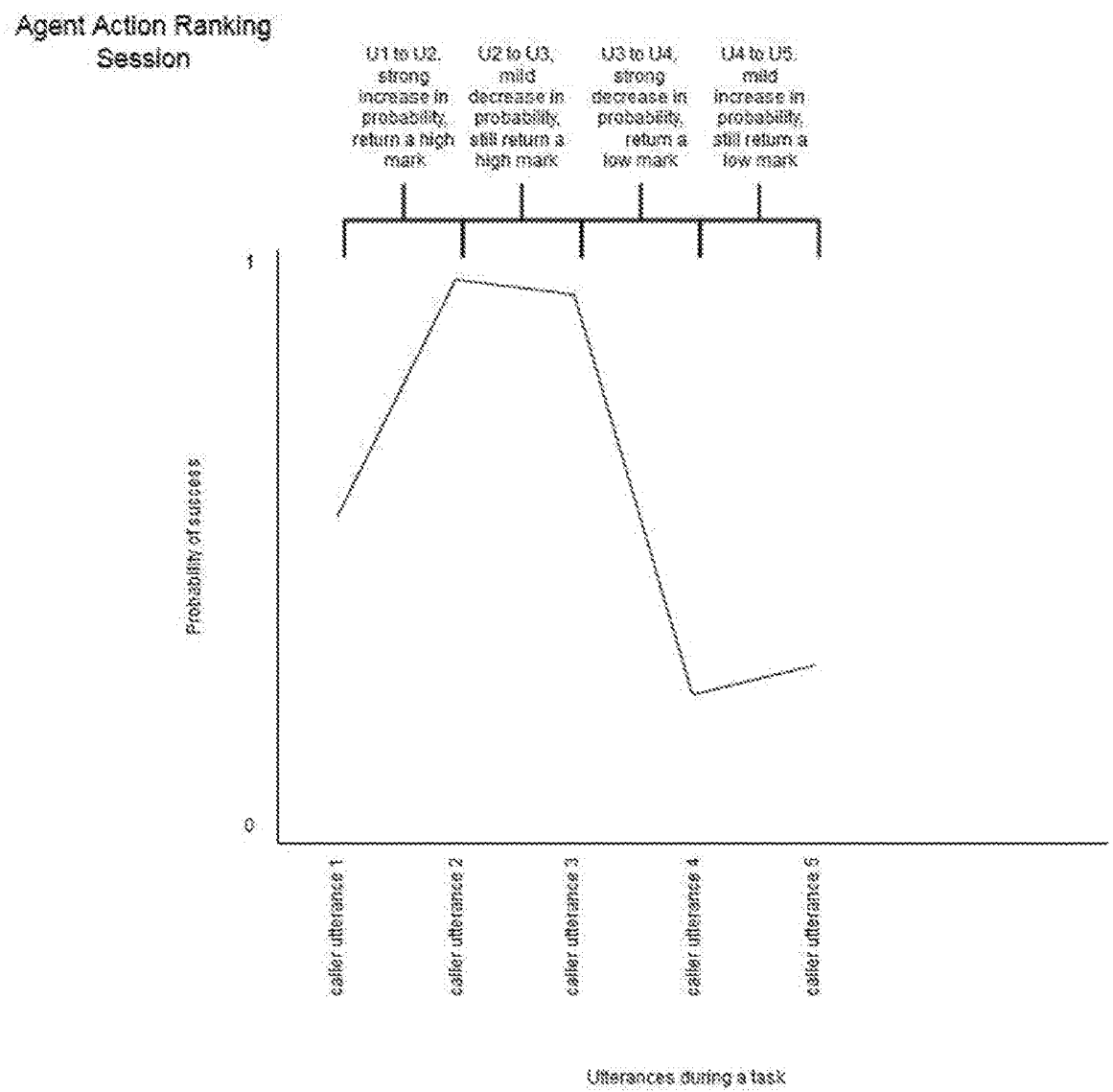
FIG. 8 is an exemplary graph illustrating the task completion probability results (y-axis) in relation to caller utterances (x-axis) according to various aspects of the disclosure.

FIG. 8 is an exemplary graph illustrating the task completion probability result (y-axis) in relation to caller utterances (x-axis) according to various aspects of the disclosure. As shown in FIG. 8, the changes in the task completion probability results can be evaluated to compute the agent action score for each caller utterance. In an example embodiment, the utterances are processed in a time order with utterance two following utterance one, utterance three following utterance 2, and so on. The difference in the slope of the graph in FIG. 8 further illustrates level (e.g., strong or mild) of the increase or the decrease in the probability of successfully completing the identified task for each caller utterance. The slopes between utterances can be the computed values for difference (e.g., $\Delta_{Slope}$). Any steep slope change, which represents a significant change in the probability of success for the session, represents either a positive change (steep positive slope, e.g., utterance one to utterance two) to the session or a negative change (steep negative slope, e.g., utterance three to utterance four). The positive change returns a high positive change in probability score and that interaction between utterances. The negative change returns a large negative change in the probability score.

Figure 9:
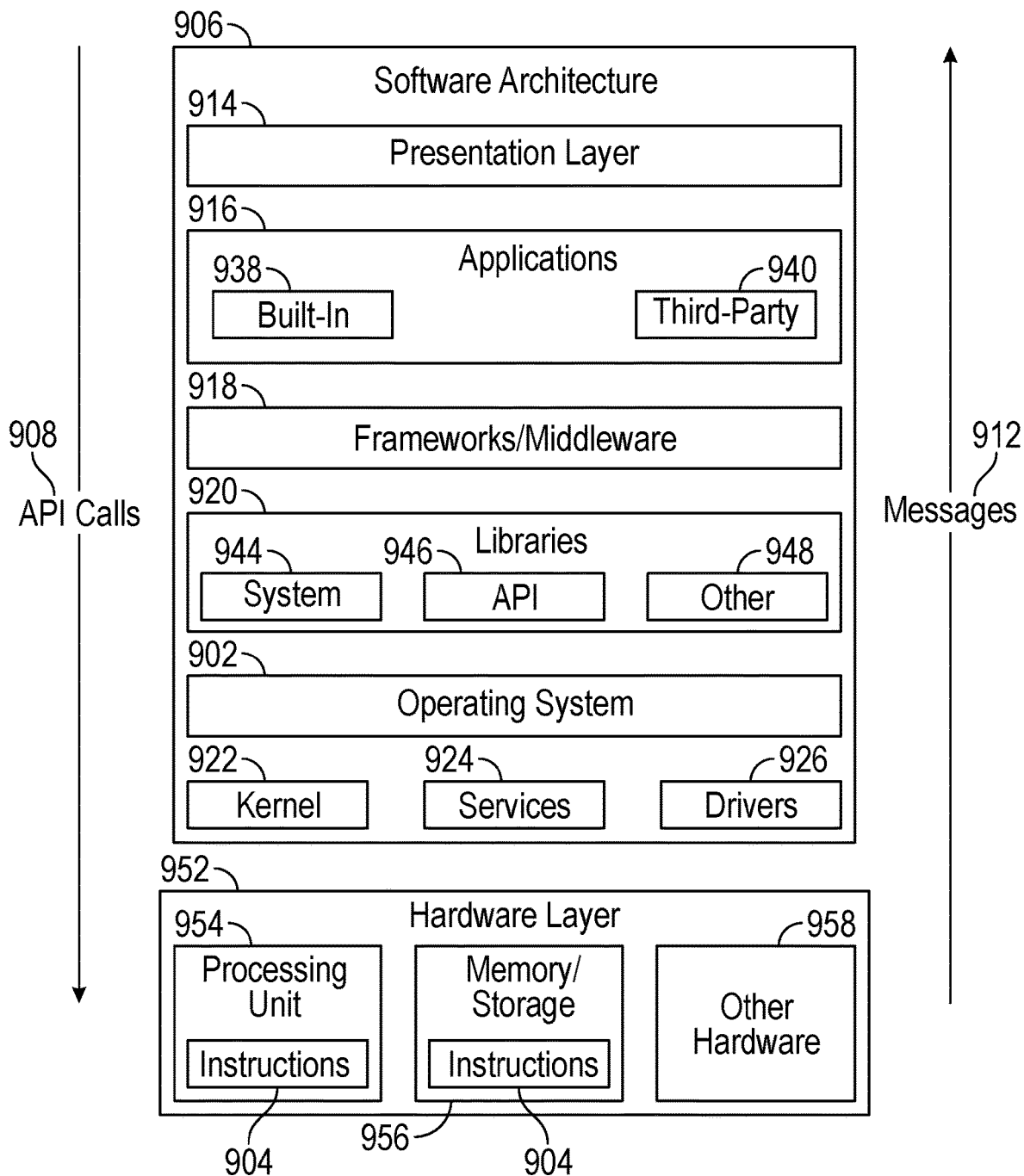
FIG. 9 is a block diagram illustrating a representative software architecture, which may be used in conjunction with various hardware architectures herein described.

FIG. 9 is a block diagram illustrating an exemplary software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory or storage modules memory/storage 956, which also have executable instructions 904. The hardware layer 952 may also comprise other hardware 958.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a processor or other programmable processor. Once configured by such software, hardware components become specific machines (or specific components of a machine) uniquely tailored to perform the configured functions and are no longer processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit, circuitry, or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously. The processor as used herein may be a hardware component, which is in at least one of the devices, systems, servers and the like. The processor may include multiple cores and may be spread across multiple devices. The processor includes circuitry to execute instructions relating to the methods and structures described herein for determining relationships and outputting relationship data that is used by various device and their users.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a processor configured by software to become a special-purpose processor, the processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 or other components within the layers may invoke application programming interface (API) API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 or other components or layers. The libraries 920 provide functionality that allows other software components to perform tasks in an easier fashion than to interface directly with the underlying operating system 902 functionality (e.g., kernel 922, services 924 or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 or other software components/modules, some of which may be specific to a particular operating system 902 or platform.

The applications 916 include built-in applications 938 or third-party applications 940. The third-party applications 940 may invoke the API calls 908 provided by the operating system 902 to facilitate functionality described herein.

The applications 916 may use built in operating system functions (e.g., kernel 922, services 924 or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
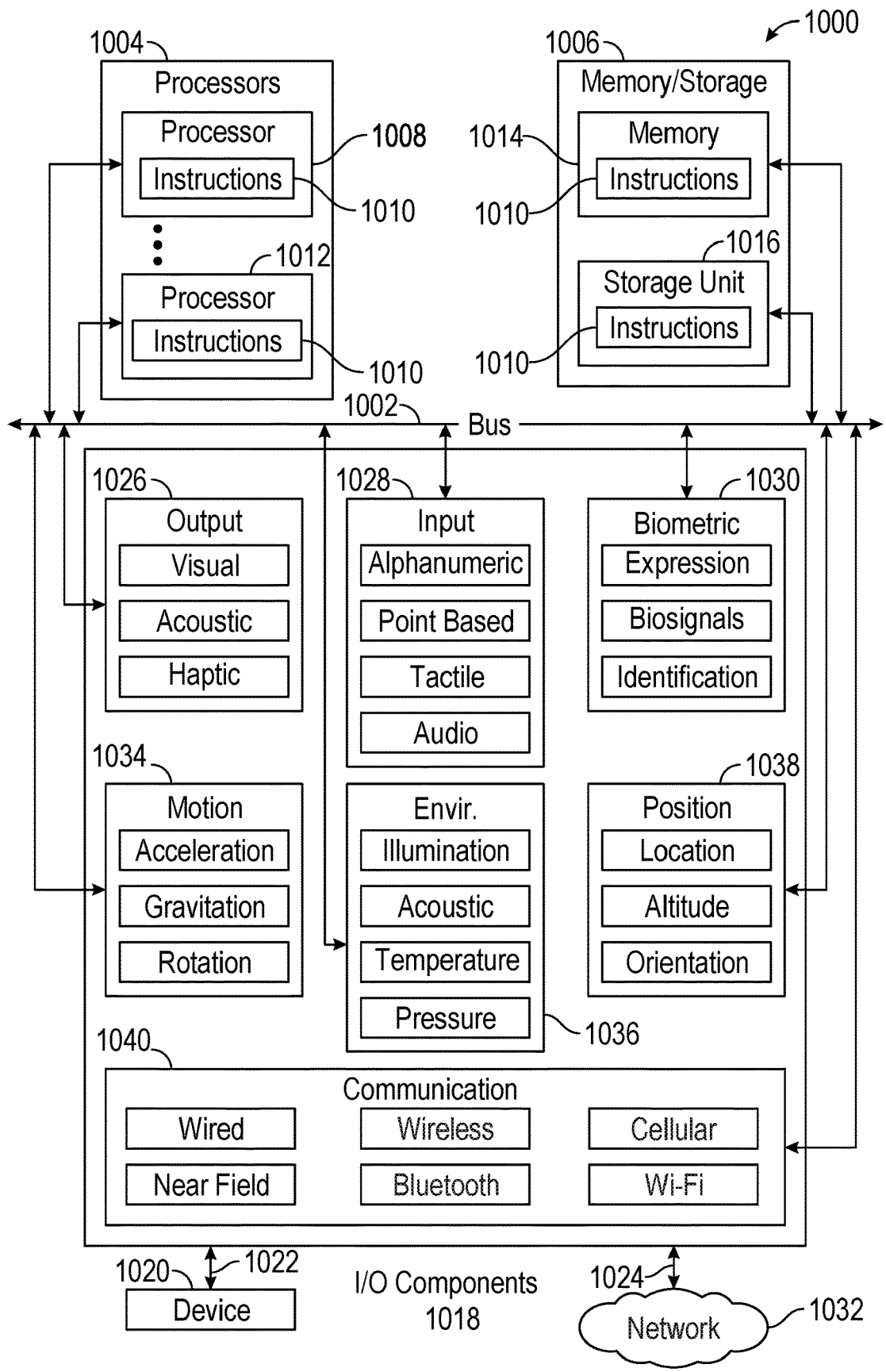
FIG. 10 is a block diagram illustrating components of a machine, according to some exemplary embodiments, able to read instructions from a machine-readable medium (e.g., a machine-readable storage medium) and perform any one or more of the methodologies discussed herein.

FIG. 10 is a block diagram illustrating components (also referred to herein as "modules") of a machine 1000, according to some exemplary embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a laptop computer, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1018 may include a wide variety of components to provide a user interface for receiving input, providing output, producing output, transmitting information, exchanging information, capturing measurements, and so on. The specific I/O components 1018 that are included in the user interface of a particular machine 1000 will depend on the type of machine. It will be appreciated that the I/O components 1018 may include many other components that are not shown in FIG. 10. The I/O components 1018 are grouped according to functionality merely for simplifying the following discussion and the grouping is in no way limiting. In various exemplary embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 1028 may also include one or more image-capturing devices, such as a digital camera for generating digital images or video.

In further exemplary embodiments, the I/O components 1018 may include biometric components 1030, motion components 1034, environmental environment components 1036, or position components 1038, as well as a wide array of other components. One or more of such components (or portions thereof) may collectively be referred to herein as a "sensor component" or "sensor" for collecting various data related to the machine 1000, the environment of the machine 1000, a user of the machine 1000, or a combinations thereof.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)). Moreover, the communication components 1040 may detect identifiers or include components operable to detect identifiers.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a processor; and
    a memory component having instructions stored thereon, when executed by the processor, causes the processor to perform operations comprising:
        receiving an audio signal of a communication session between a member-related client device and an agent client device, wherein a caller is associated with the member-related client device;
        processing the audio signal to generate a plurality of caller utterances, each of the plurality of caller utterances includes an audio caller utterance and a transcribed caller utterance, the plurality of caller utterances includes a first caller utterance and a second caller utterance;
        for each of the plurality of caller utterances,
            generating a relationship data based on the transcribed caller utterance,
            generating an identified task based on the transcribed caller utterance, and
            generating a task completion probability result based on the audio caller utterance, the relationship data, and the identified task, and
            storing the task completion probability result in a database;
        computing an agent action ranking score that is based on a difference between the task completion probability result of the first caller utterance and the task completion probability result of the second caller utterance, wherein the second caller utterance precedes the first caller utterance; and
        generating an agent action result including the agent action ranking score.

2. The system of claim 1, wherein the processor to perform operations further comprising:
    for each of the plurality of caller utterances, normalizing the agent action ranking score.

3. The system of claim 1, wherein the agent action ranking score indicates a level of beneficial change or a level of negative change based on the difference between the task completion probability result of the first caller utterance and the task completion probability result of the second caller utterance.

4. The system of claim 1, further comprising:
    a plurality of neural networks including a task neural network and a plurality of flow neural networks.

5. The system of claim 4, wherein the task neural network is a convolution neural network, and the plurality of flow neural networks are convolution neural networks.

6. The system of claim 4, wherein, for each of the plurality of caller utterances, generating the identified task based on the transcribed caller utterance further comprises:
processing the transcribed caller utterance using the task neural network generate the identified task.

7. The system of claim 6, wherein, for each of the plurality of caller utterances, generating the identified task based on the transcribed caller utterance further comprises:
selecting a flow neural network from the plurality of flow neural networks that is associated with the identified task, and
processing the transcribed caller utterance using the selected flow neural network generate a position in a logical flow associated with the identified task.

8. The system of claim 7, wherein, for each of the plurality of caller utterances, generating the identified task based on the transcribed caller utterance further comprises:
generating a task result that includes the identified task and the position in the logical flow associated with the identified task.

9. The system of claim 1, wherein the relationship data includes at least one potential relationship between the caller and a patient that is the subject of the transcribed caller utterance.

10. The system of claim 1, wherein, for each of the plurality of caller utterances, generating the task completion probability result based on the audio caller utterance, the relationship data, and the identified task further comprises:
sampling the audio caller utterance to generate a plurality of samples of the audio caller utterance;
generating a loudness result based on loudness values of the plurality of samples using a loudness neural network associated with the identified task;
generating a pitch result based on pitch values of the plurality of samples using a pitch neural network associated with the identified task;
generating a tone result for a plurality of words in the transcribed caller utterance using a tone neural network associated with the identified task; and
generating the task completion probability result using a task completion probability neural network associated with the identified task, wherein generating the task completion probability result is based on the loudness result, the pitch result, or the tone result.

11. The system of claim 1, wherein the communication session includes at least one of: an interactive voice response (IVR) or a voice call.

12. A method comprising:
receiving an audio signal of a communication session between a member-related client device and an agent client device, wherein a caller is associated with the member-related client device;
processing the audio signal to generate a plurality of caller utterances, each of the plurality of caller utterances includes an audio caller utterance and a transcribed caller utterance, the plurality of caller utterances includes a first caller utterance and a second caller utterance;
for each of the plurality of caller utterances,
generating a relationship data based on the transcribed caller utterance,
generating an identified task based on the transcribed caller utterance, and
generating a task completion probability result based on the audio caller utterance, the relationship data, and the identified task, and
storing the task completion probability result in a database;
computing an agent action ranking score that is based on a difference between the task completion probability result of the first caller utterance and the task completion probability result of the second caller utterance, wherein the second caller utterance precedes the first caller utterance; and
generating an agent action result including the agent action ranking score.

13. The method of claim 12, further comprising: for each of the plurality of caller utterances, normalizing the agent action ranking score.

14. The method of claim 12, wherein the agent action ranking score indicates a level of beneficial change or a level of negative change based on the difference between the task completion probability result of the first caller utterance and the task completion probability result of the second caller utterance.

15. The method of claim 12, further comprising:
a plurality of neural networks including a task neural network and a plurality of flow neural networks, wherein the task neural network is a convolution neural network, and the plurality of flow neural networks are convolution neural networks.

16. The method of claim 15, wherein, for each of the plurality of caller utterances, generating the identified task based on the transcribed caller utterance further comprises:
processing the transcribed caller utterance using the task neural network generate the identified task;
selecting a flow neural network from the plurality of flow neural networks that is associated with the identified task; and
processing the transcribed caller utterance using the selected flow neural network generate a position in a logical flow associated with the identified task.

17. The method of claim 16, wherein, for each of the plurality of caller utterances, generating the identified task based on the transcribed caller utterance further comprises:
generating a task result that includes the identified task and the position in the logical flow associated with the identified task.

18. The method of claim 12, wherein the relationship data includes at least one potential relationship between the caller and a patient that is the subject of the transcribed caller utterance.

19. The method of claim 12, wherein generating the task completion probability result based on the audio caller utterance, the relationship data, and the identified task further comprises:
sampling the audio caller utterance to generate a plurality of samples of the audio caller utterance;
generating a loudness result based on loudness values of the plurality of samples using a loudness neural network associated with the identified task;
generating a pitch result based on pitch values of the plurality of samples using a pitch neural network associated with the identified task;
generating a tone result for a plurality of words in the transcribed caller utterance using a tone neural network associated with the identified task; and
generating the task completion probability result using a task completion probability neural network associated with the identified task, wherein generating the task completion probability result is based on the loudness result, the pitch result, or the tone result.

20. The method of claim 12, wherein the communication session includes at least one of: an interactive voice response (IVR) or a voice call.

21. A non-transitory computer-readable storage medium having stored thereon instructions, when executed by a processor, causes the processor to perform operations comprising:

receiving an audio signal of a communication session between a member-related client device and an agent client device, wherein a caller is associated with the member-related client device;

processing the audio signal to generate a plurality of caller utterances, each of the plurality of caller utterances includes an audio caller utterance and a transcribed caller utterance, the plurality of caller utterances includes a first caller utterance and a second caller utterance;

for each of the plurality of caller utterances, generating a relationship data based on the transcribed caller utterance, generating an identified task based on the transcribed caller utterance, and generating a task completion probability result based on the audio caller utterance, the relationship data, and the identified task, and storing the task completion probability result in a database;

computing an agent action ranking score that is based on a difference between the task completion probability result of the first caller utterance and the task completion probability result of the second caller utterance, wherein the second caller utterance precedes the first caller utterance; and generating an agent action result including the agent action ranking score.

\* \* \* \* \*